(12) United States Patent
Chen et al.

(10) Patent No.: US 10,838,540 B2
(45) Date of Patent: Nov. 17, 2020

(54) TOUCH CONTROL DEVICE WITH ESD PROTECTION

(71) Applicant: WISECHIP SEMICONDUCTOR INC., Miaoli County (TW)

(72) Inventors: Chien-Hsun Chen, Jhunan Township (TW); Yung-Cheng Tsai, Jhunan Township (TW); Chien-Le Li, Jhunan Township (TW); Shih-Hong Jhang, Jhunan Township (TW); You-Hong Jhang, Jhunan Township (TW)

(73) Assignee: WISECHIP SEMICONDUCTOR INC., Miaoli County (TW)

( * ) Notice: Subject to any disclaimer, the term of this patent is extended or adjusted under 35 U.S.C. 154(b) by 338 days.

(21) Appl. No.: 15/906,063

(22) Filed: Feb. 27, 2018

(65) Prior Publication Data

US 2019/0265830 A1    Aug. 29, 2019

(51) Int. Cl.
*G06F 3/041* (2006.01)
*H02H 9/04* (2006.01)
*G06F 3/044* (2006.01)

(52) U.S. Cl.
CPC ............ *G06F 3/0416* (2013.01); *G06F 3/044* (2013.01); *G06F 3/0443* (2019.05); *G06F 3/0448* (2019.05); *G06F 3/04166* (2019.05); *H02H 9/045* (2013.01); *G06F 2203/04107* (2013.01)

(58) Field of Classification Search
CPC .. G06F 3/0416; G06F 3/04166; G06F 3/0448; H02H 9/045
See application file for complete search history.

(56) References Cited

U.S. PATENT DOCUMENTS

| | | | |
|---|---|---|---|
| 2016/0156177 A1* | 6/2016 | Lin | G06F 3/041 345/173 |
| 2018/0217711 A1* | 8/2018 | Teranishi | G06F 3/0416 |

* cited by examiner

*Primary Examiner* — Scott Bauer
(74) *Attorney, Agent, or Firm* — Amin, Turocy & Watson, LLP

(57) ABSTRACT

A touch control device with ESD protection includes a touch display panel, a switching unit, a touch electrode and a ground electrode. An ESD protection electrode is provided around at least one periphery of the touch display panel. A scanning period of the ESD protection electrode is divided into touch periods and ESD periods. When the scanning period of the ESD protection electrode is during the touch periods, the ESD protection electrode is used as touch electrodes for sensing touch events made by a user on the touch display panel. When the scanning period of the ESD protection electrode is during the ESD periods, the ESD protection electrode is used as ESD protection electrodes for dissipating ESD on the touch display panel in order to protect signal elements inside the touch display panel. The ESD protection electrode is therefore used for not only ESD protection, but also touch sensing.

8 Claims, 5 Drawing Sheets

TOUCH CONTROL DEVICE WITH ESD PROTECTION

BACKGROUND

1. Technical Field

The present disclosure relates to touch control devices, and, more particularly, to a touch control device with electrostatic charge (ESD) protection.

2. Description of Related Art

When the finger of a user comes into contact with a touch panel and rubs against the surface of the touch panel, an electrostatic discharge current may be created on the touch panel. Since the voltage of ESD is typically much greater than the voltage provided to the touch panel, when ESD occurs on a specific area of the touch panel, the components on the touch panel may be damaged, such that the touch panel may not function properly or even at all.

In general, a touch panel adopts an ESD control method, such as the one shown in FIG. 1. A touch panel 60 has a plurality of electrodes 61 distributed within a touch control area 62, and each of the electrodes 61 is electrically connected to a signal element 611 that is laid out on the outer edges of the touch control area 62 to be electrically wired to a bonding area 63 at one side of the touch control area 62 outside the touch control area 62. A ground line 64 surrounding the signal elements 611 is provided around the periphery of the touch control area 62. The ground line 64 is electrically connected to a flexible circuit board 70, and electrically connected to a system ground (not shown) via the flexible circuit board 70 to form a dissipating path. When ESD is occurred on the periphery of the touch panel 60, the ESD will be guided to the system ground via the ground line 64, preventing a dissipating path formed through the signal elements 611. The ESD is released through the ground line 64 to protect the internal signal elements 611. However, the circuit structure shown in FIG. 1 separates the signal elements 611 for touch sensing and the ground line 64 into independent traces, the signal elements 611 are used as touch electrodes, and the ground line 64 are used as dissipating path for the ESD. The manufacturing process requires higher cost and precision.

A touch panel disclosed in TW Patent No. M434256 is shown in FIG. 2. The touch panel includes an upper conductive layer 1 and a lower ITO glass sheet. The traces on the upper conductive layer 1 intersect with the traces on the lower ITO glass sheet, forming a plurality of nodes 3 for touch control. The traces on the upper and lower layers are connected externally to a flexible circuit board 4, wherein a metal guard loop is embedded around the periphery of the body of the touch screen. Both ends of the metal guard loop are connected to the flexible circuit board 4 via leads, and further connected to a ground of an externally-connected circuit board. The charges built up on the traces are dissipated through the metal guard loop and the pins of the flexible circuit board 4 to the ground, preventing catastrophic failures or damages of the product caused by the ESD. Although the ESD issue is addressed in this document, the wiring for the metal guard loop and the wiring for touch sensing are still two independent group of traces, which requires a high-precision manufacturing process that is more costly.

Referring to FIG. 3, Chinese Patent Application Publication No. CN10563022A discloses a touch module that integrates an ESD protection signal transmission path and a touch control system, wherein only one path is turned on at any instance to allow a transmission signal to arrive at an output end TXn in order to drive the touch panel. When a switching scanning signal Sn turns on a switch W, and an inverted switching scanning signal SBn turns off a transistor Ms0, the transmission signal is allowed to reach the output end TXn. On the contrary, when the switching scanning signal Sn turns off the switch W, and the inverted switching scanning signal SBn turns on the transistor Ms0, the transmission signal is barred from the output end TXn. Since the transistor Ms0 is turned on, the output end TXn is pulled down to ground. An ESD protection circuit 20 is electrically connected as independent traces on the signal transmission path for detecting the occurrence of abnormal ESD in the touch control signals. If an abnormal ESD is detected, the ESD protection circuit 20 will intercept the signal and let the signal flow to the ground via the transistor Ms0. However, the transistor Ms0 in this document is provided on the ESD path and prone to damage by the ESD. In addition, the ESD protection circuit 20 and the transmission signals driving the touch panel are designed as two independent groups of traces, which still requires a manufacturing process that is high in cost and precision.

As such, there is a need for a new technique that effective eliminates ESD damages on touch panels without the need for an expensive and high-precision manufacturing process.

SUMMARY

The main objective of the present disclosure is to provide a touch control device with ESD protection that requires no high-precision manufacturing process and greatly reduces manufacturing cost by using an ESD protection electrode on a touch display panel for both dissipating ESD and touch sensing.

In order to achieve the above and other objectives, the present disclosure provides a touch control device with electrostatic discharge (ESD) protection including a touch display panel, a switching unit, a touch electrode and a ground electrode. An ESD protection electrode is provided around at least one periphery of the touch display panel, such that when ESD is occurred on the touch display panel, the ESD is dissipated via the ESD protection electrode to protect the internal signal circuits. An input end of the switching unit is electrically connected to the ESD protection electrode. A scanning period of the ESD protection electrode is divided into touch periods and ESD periods. When the scanning period of the ESD protection electrode is during the touch periods, the output end of the switching unit is electrically connected with the touch electrode, thereby forming a touch mode. When the scanning period of the ESD protection electrode is during the ESD periods, the output end of the switching unit is electrically connected with the ground electrode, thereby form an ESD mode. In the touch periods the scanning signal of the ESD protection electrode drives a touch potential higher than zero volt, while in the ESD periods the scanning signal of the ESD protection electrode drives a zero-volt potential.

DETAILED DESCRIPTION OF THE EMBODIMENTS

Figure 1:
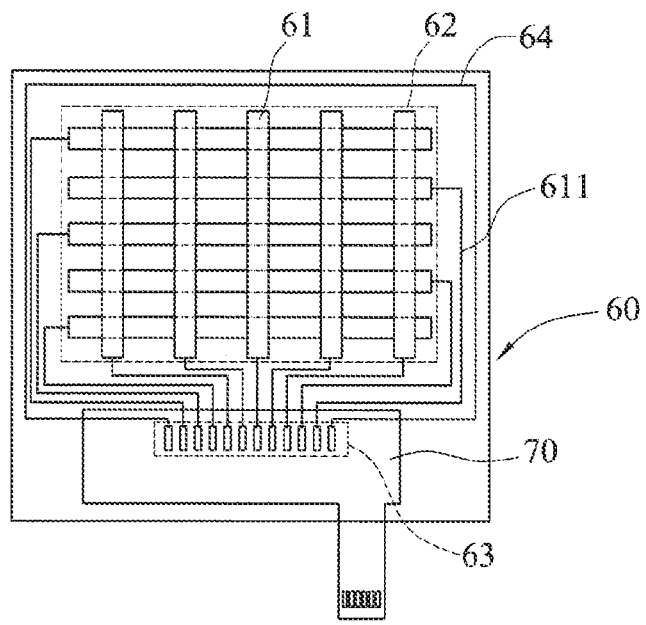
FIG. 1 is a planar schematic diagram depicting the structure of a conventional touch panel.
Figure 2:
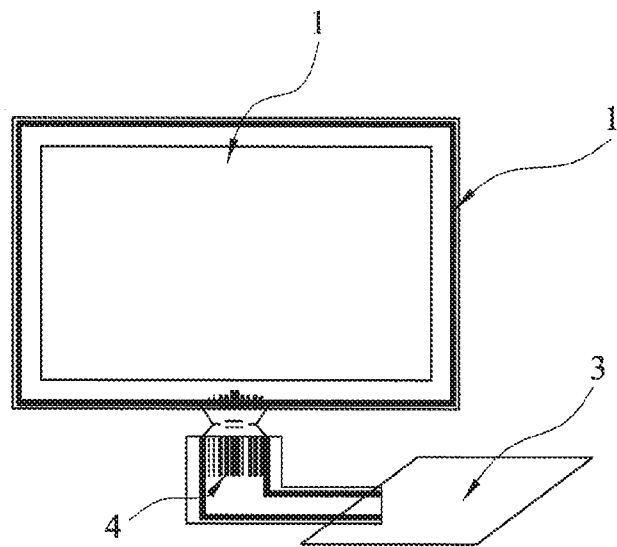
FIG. 2 is a planar schematic diagram depicting the structure of another conventional touch panel.
Figure 3:
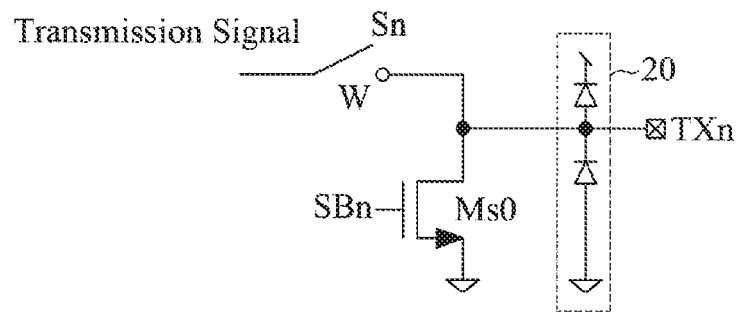
FIG. 3 is a circuit diagram depicting a circuit integrating ESD protection signal transmission path and a touch control system.
Figure 4:
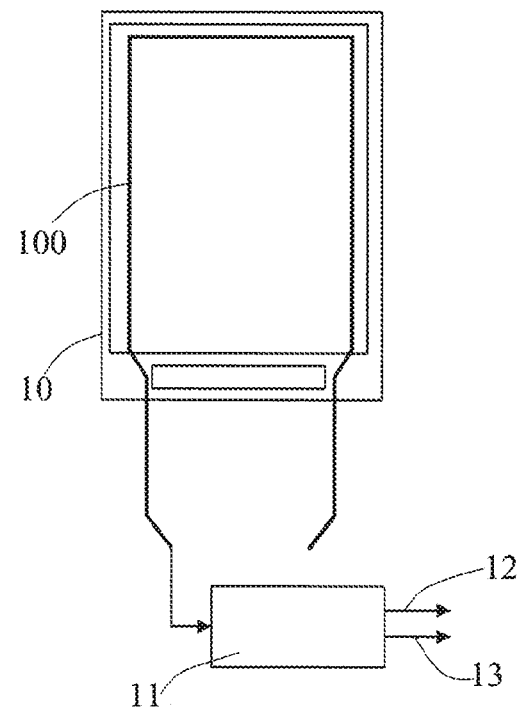
FIG. 4 is a planar schematic diagram depicting the structure of a touch control device in accordance with a first embodiment of the present disclosure.
Figure 5:
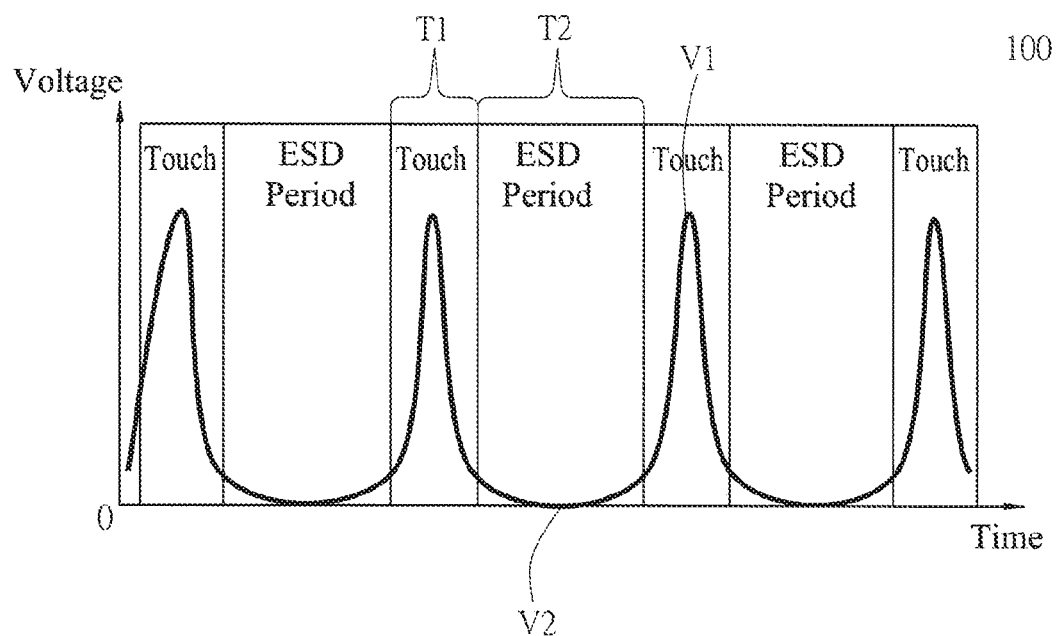
FIG. 5 is a schematic diagram depicting periods of a scanning signal of the first embodiment of the present disclosure.
Figure 6:
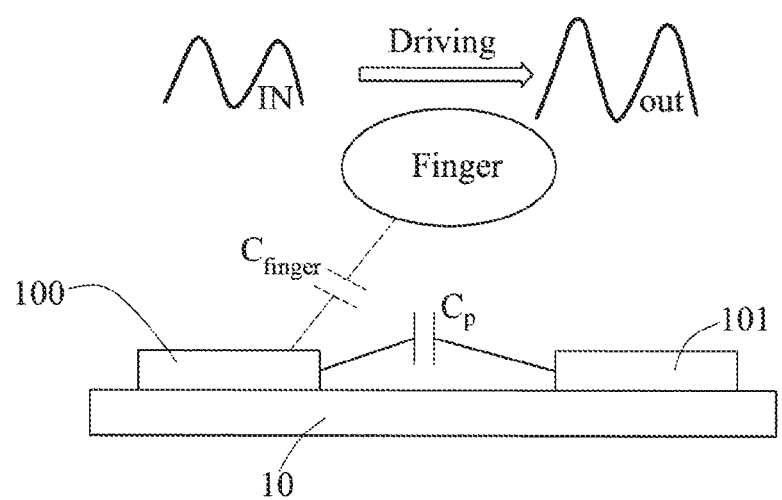
FIG. 6 is a cross-sectional diagram of the first embodiment of the present disclosure.

Referring to FIGS. 4 to 6, a planar schematic diagram depicting the structure of a touch control device in accordance with a first embodiment of the present disclosure, a schematic diagram depicting periods of a scanning signal of the first embodiment, and a cross-sectional diagram of the first embodiment are shown, respectively. The touch control device includes: a touch display panel 10, a switching unit 11, a touch electrode 12 and a ground electrode 13.

An electrostatic discharge (ESD) protection electrode 100 is provided around at least one periphery of the touch display panel 10, and an adjacent display electrode 101 is provided on the inner side of the ESD protection electrode 100. When ESD is created on the touch display panel 10, the ESD can be directly dissipated through the ESD protection electrode 100, thereby protecting signal elements (not shown) in the touch display panel 10.

As shown in FIG. 5, a scanning period of the ESD protection electrode 100 can be divided into two types of periods: touch periods T1 and ESD periods T2. During the touch periods T1, a scanning signal of the ESD protection electrode 100 drives a touch potential V1 that is higher than zero volt, whereas during the ESD periods, the scanning signal of the ESD protection electrode 100 drives a ground potential V2 equal to zero volt. In normal circumstances, the scanning signal of the ESD protection electrode 100 performs scanning of the touch periods T1 and ESD periods T2 based on a predetermined frequency. In an embodiment of the present disclosure, the scanning frequency of the scanning signal of the ESD protection electrode 100 is 80-120 Hz. However, this is a preferred embodiment of the present disclosure, and the present disclosure is not limited to this.

An input end of the switching unit 11 is electrically connected to the ESD protection electrode 100. When the scanning period of the ESD protection electrode 100 is during the touch period T1, an output end of the switching unit 11 is switched to a touch mode in that it is electrically connected to the touch electrode 12, such that the ESD protection electrode 100 can be used for touch sensing. On the other hand, when the scanning period of the ESD protection electrode 100 is during the ESD period T2, the output end of the switching unit 11 is switched to an ESD mode in that it is electrically connected to the ground electrode 13, such that the ESD protection electrode 100 can be used for dissipating ESD.

Referring to FIG. 6, there is a sensing capacitance Cp between the ESD protection electrode 100 and the adjacent display electrode 101 on the touch display panel 10. When the touch display panel 10 is not touched, the measured output capacitance is approximately the same as the sensing capacitance Cp. When a touch event is occurred, for example, due to a user's finger touching the ESD protection electrode 100 on the touch display panel 10, a touch capacitance Cfinger is formed between the user's finger and the ESD protection electrode 100. The touch capacitance Cfinger and the sensing capacitance Cp are linked in parallel to form an output capacitance. The measured output capacitance will be greater than the sensing capacitance Cp (when there is no touch event). The above is related to self-capacitive sensing principle well known in the field, and will not be further described. The above embodiment is merely used to illustrate the principles and technical effects of the present disclosure, and is not to be construed to limit the present disclosure in any way.

When in use, under the touch mode, the touch potential V1 of the ESD protection electrode 100 changes with the output capacitance. When the user's finger touches the ESD protection electrode 100, the scanning signal of the ESD protection electrode 100 drives the higher touch potential V1 during the touch periods T1 since the output capacitance is greater than the sensing capacitance Cp when no touch event is present. In the ESD mode, the scanning signal of the ESD protection electrode 100 drives the zero-volt ground potential V2 during the ESD periods T2.

Accordingly, in the first embodiment of the present disclosure the scanning period of the ESD protection electrode 100 is divided into two types of periods: the touch periods T1 and the ESD periods T2, and the scanning signal is switched with these two periods according to the switching unit 11. As a result, when the touch display panel 10 according to the present disclosure is applied to various kinds of touch sensing devices, the ESD protection electrode 100 on the touch display panel 10 can be used not only as an ESD electrode during the ESD periods T2 to dissipate noise interference surrounding the touch display panel 10; but also used as a touch electrode during the touch periods T1 when the ESD protection electrode 100 of the touch display panel 10 is touched by the user's finger to allow touch sensing operations to be performed on the touch display panel 10.

Figure 7:
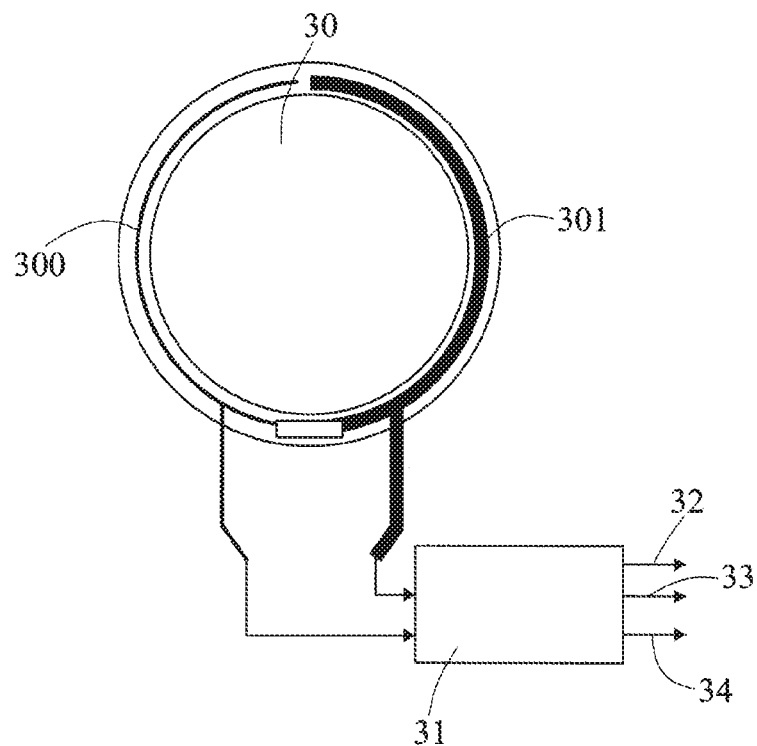
FIG. 7 is a planar schematic diagram depicting the structure of a touch control device in accordance with a second embodiment of the present disclosure.
Figure 8:
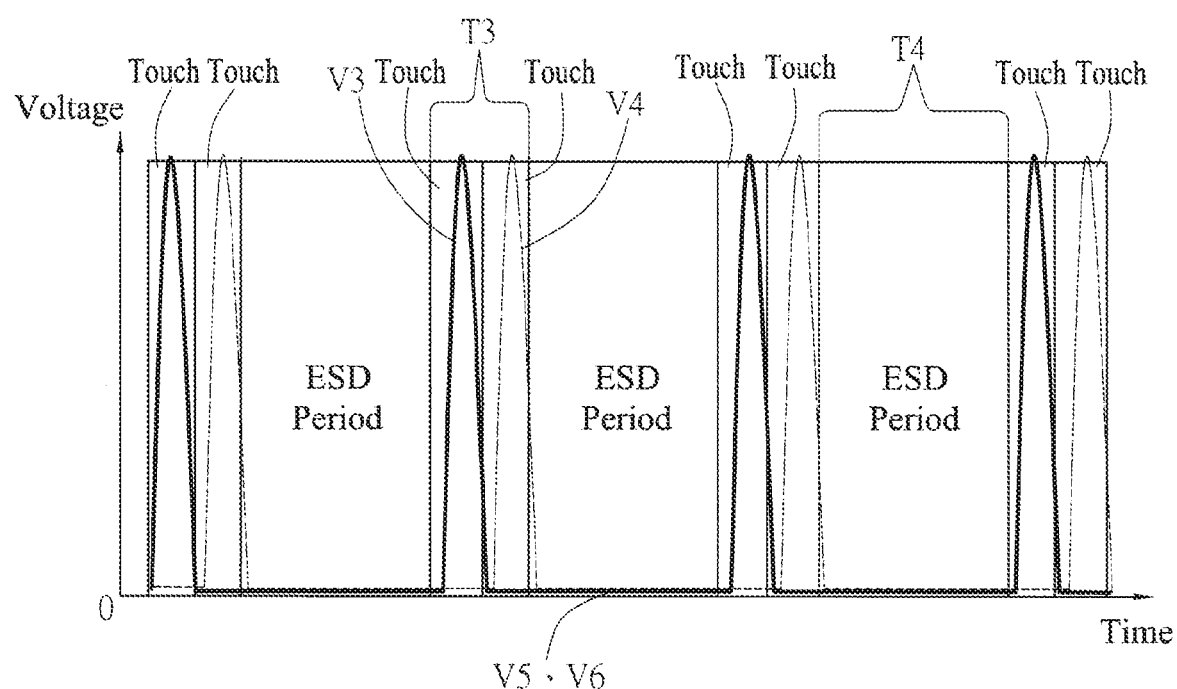
FIG. 8 is a schematic diagram depicting periods of scanning signals of the second embodiment of the present disclosure.
Figure 9:
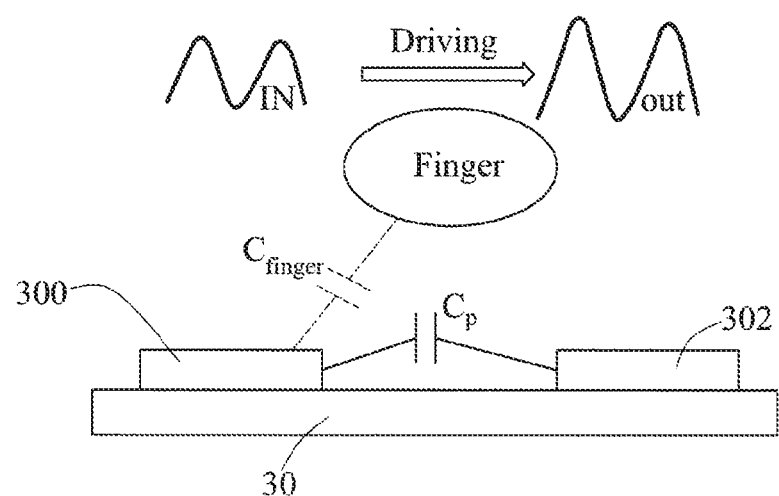
FIG. 9 is a cross-sectional diagram of the second embodiment of the present disclosure.

Referring now to FIGS. 7 to 9, a planar schematic diagram depicting the structure of a touch control device in accordance with a second embodiment of the present disclosure, a schematic diagram depicting periods of a scanning signal of the second embodiment, and a cross-sectional diagram of the second embodiment are shown, respectively. The touch control device includes: a touch display panel 30, a switching unit 31, a first touch electrode 32, a second touch electrode 33 and a ground electrode 34.

In the second embodiment of the present disclosure, two protection electrodes, that is, a first ESD protection electrode 300 and a second ESD protection electrode 301, are provided around at least one periphery of the touch display panel 30. An adjacent display electrode 302 is provided on the inner side of the first and second ESD protection electrodes 300 and 301. When an abnormal ESD is created on the touch display panel 30, the ESD can be directly dissipated through the first or second ESD protection electrodes 300 or 301, thereby protecting signal elements (not shown) in the touch display panel 30.

As shown in FIG. 8, scanning periods of the first and second ESD protection electrodes 300 and 301 can be divided into two types of periods: touch periods T3 and ESD periods T4. During the touch periods T3, the scanning signals of the first and second ESD protection electrodes 300 and 301 drive respective touch potentials V3 and V4 that are greater than zero volt, whereas during the ESD periods, the scanning signals of the first and second ESD protection electrodes 300 and 301 drive zero-volt ground potentials V5 and V6. In normal circumstances, the scanning signals of the first and second ESD protection electrodes 300 and 301 perform scanning of the touch periods T3 and ESD periods T4 based on a predetermined frequency. In an embodiment of the present disclosure, the scanning frequencies of the scanning signals of the first and second ESD protection electrodes 300 and 301 are 80-120 Hz. However, this is a preferred embodiment of the present disclosure, and the present disclosure is not limited to this.

Input ends of the switching unit 31 are electrically connected to the first and second ESD protection electrodes 300 and 301. Output ends of the switching unit 31 are electrically connected to the first touch electrode 32, the second touch electrode 33 or the ground electrode 34 depending on the scanning signals of the first ESD protection electrode 300 and the second ESD protection electrode 301.

When the scanning period of the first ESD protection electrode 300 (or the second ESD protection electrode 301) is during the touch periods T3, the respective output end of the switching unit 31 is switched to a touch mode in that it is electrically connected to the first touch electrode 32 (or the second touch electrode 33), such that the first ESD protection electrode (or the second ESD protection electrode 301) can be used for touch sensing. When the scanning period of the first ESD protection electrode 300 (or the second ESD protection electrode 301) is during the ESD periods T4, the respective output end of the switching unit 11 is switched to an ESD mode in that it is electrically connected to the ground electrode 34, such that the first ESD protection electrode 300 (or the second ESD protection electrode 301) can be used for dissipating ESD.

Referring to FIG. 9, the determining as to whether a touch event occurs in the second embodiment of the present disclosure is the same as that described with respect to the first embodiment of the present disclosure, that is, by comparing the output capacitance with the sensing capacitance Cp, details of which can be found by referring to the descriptions above, and will not be further described.

In the touch mode, the touch potentials V3 and V4 of the first and second ESD protection electrodes 300 and 301 change with the capacitance of the output capacitor. When the user's finger touches the first ESD protection electrode 300 or the second ESD protection electrode 301, the scanning signal of the first and second ESD protection electrodes 300 and 301 drive the respective higher touch potentials V3 and V4 during the touch periods T3 since the output capacitance is greater than the sensing capacitance Cp (when no touch event is present). In the ESD mode, the scanning signals of the first and second ESD protection electrodes 300 and 301 drive the respective zero-volt ground potentials V5 and V6 during the ESD periods T4.

In the second embodiment of the present disclosure, the scanning periods of the first and second ESD protection electrodes 300 and 301 are divided into two types of periods: the touch periods T3 and the ESD periods T4, and the scanning signal is switched with these two periods according to the switching unit 31. As a result, when the touch display panel 30 according to the present disclosure is applied to various kinds of touch sensing devices, the first ESD protection electrode 300 and the second ESD protection electrode 301 on the touch display panel 10 can be used not only as ESD electrodes during the ESD periods T4 to dissipate noise interference surrounding the touch display panel 30; but also used as touch electrodes during the touch periods T3 when the first ESD protection electrode 300 and the second ESD protection electrode 301 of the touch display panel 30 are touched by the user's finger to allow touch sensing operations to be performed on the touch display panel 30.

In the second embodiment of the present disclosure, during the touch periods T3 the first ESD protection electrode 300 and the second ESD protection electrode 301 can independently drive touch potentials V3 and V4, respectively, at different times. In other words, when the user's finger touches only the first ESD protection electrode 300 the scanning signal during the touch period T3 obtains the touch potential V3, when the user's finger touches only the first ESD protection electrode 300 the scanning signal during the touch period T3 obtains the touch potential V3, or when the user's finger touches only the second ESD protection electrode 301 the scanning signal during the touch period T3 obtains the touch potential V4, or when the user's fingers touch both the first ESD protection electrode 300 and the second ESD protection electrode 301 the scanning signals obtain the touch potentials V3 and V4 during the touch period T3. Therefore, when the touch display panel 30 of the second embodiment of the present disclosure is applied to a touch sensing device, the operations of the user on the touch sensing device can be interpreted by determining whether only the touch potential V3 or only the touch potential V4 is driven by the scanning signal, or both the touch potentials V3 and V4 are simultaneously driven by the scanning signals.

For example, in the touch mode (that is, output end(s) of the switching unit 31 is/are electrically connected to the first touch electrode 32 or the second touch electrode 33), if the scanning signal obtained is the touch potential V3, then the action of the user can be interpreted as operating on the left-hand side of the touch sensing device; if the obtained scanning signal is the touch potential V4, then the action of the user can be interpreted as operating on the right-hand side of the touch sensing device; and if the obtained scanning signals are the touch potentials V3 and V4, then the action of the user can be interpreted as turning on or off touch sensing operations. On the contrary, in the ESD mode (that is, the output end(s) of the switching unit 31 is/are electrically connected to the ground electrode 34), the first ESD protection electrode 300 or the second ESD protection electrode 301 can be used as an ESD electrode to dissipate noise interference surrounding the touch display panel 30.

The common technical features of first and second embodiments of the present disclosure allow the ESD protection electrode(s) on the touch display panel to be used not only as ESD protection electrode(s) by dissipating charges to the ground, but can also be used as touch electrode(s) for enabling the sensing of touch events made by the user on the touch display panel. The present disclosure achieves this technical feature without the need of designing an additional touch module on the panel circuit, thereby simplifying the circuit design, reducing manufacturing cost, and improving process yield.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A touch control device with electrostatic discharge (ESD) protection, comprising:
    a touch display panel;
    a switching unit;
    a touch electrode;
    a ground electrode; and
    an ESD protection electrode provided around at least one periphery of the touch display panel,
    wherein a scanning period of the ESD protection electrode is divided into touch periods and ESD periods,
    wherein an input end of the switching unit is electrically connected to the ESD protection electrode, and
    wherein when the scanning period of the ESD protection electrode is during the touch period, the output end of the switching unit is electrically connected with the touch electrode to form a touch mode, such that the ESD protection electrode is used for touch sensing, and when the scanning period of the ESD protection electrode is during the ESD period, the output end of the switching unit is electrically connected with the ground electrode to form an ESD mode, such that the ESD protection electrode is used for dissipating ESD.

2. The touch control device of claim 1, wherein during the touch periods, a scanning signal of the ESD protection electrode drives a touch potential higher than zero volt, and during the ESD periods, the scanning signal of the ESD protection electrode drives a zero-volt ground potential.

3. The touch control device of claim 1, wherein a scanning frequency of a scanning signal of the ESD protection electrode is between 80 and 120 Hz, and the scanning signal is switched with the touch periods and the ESD periods based on the scanning frequency.

4. The touch control device of claim 1, wherein an adjacent display electrode is provided on an inner side of the ESD protection electrode, a sensing capacitance exists between the adjacent display electrode and the ESD protection electrode, a touch capacitance is formed between a user's finger and the ESD protection electrode when a touch event is occured, and the touch capacitance and the sensing capacitance are linked in parallel to form an output capacitance that is greater than the sensing capacitance.

5. A touch control device with ESD protection, comprising:
    a touch display panel;
    a switching unit;
    a first touch electrode;
    a second touch electrode;
    a ground electrode; and
    a first ESD protection electrode and a second ESD protection electrode provided around at least one periphery of the touch display panel,
    wherein each of scanning periods of the first and second ESD protection electrodes is divided into touch periods and ESD periods,
    wherein input ends of the switching unit are electrically connected to the first and second ESD protection electrodes, wherein when the scanning periods of the first ESD protection electrode or the second ESD protection electrode is during the touch periods, the respective output end of the switching unit is electrically connected with the first touch electrode or the second touch electrode to form a touch mode, such that the first ESD protection electrode or the second ESD protection electrode is used for touch sensing, and when the scanning periods of the first ESD protection electrode or the second ESD protection is during the ESD periods, the respective output end of the switching unit is electrically connected with the ground electrode to form an ESD mode, such that the first ESD protection electrode or the second ESD protection electrode is used for dissipating ESD.

6. The touch control device of claim 5, wherein during the touch periods, scanning signals of the first and second ESD protection electrodes drive respective touch potentials higher than zero volt, and during the ESD periods, the scanning signals of the first and second ESD protection electrodes drive zero-volt ground potentials.

7. The touch control device of claim 5, wherein scanning frequencies of scanning signals of the first and second ESD protection electrodes are between 80 and 120 Hz, and the scanning signals are switched with the touch periods and the ESD periods based on the scanning frequencies.

8. The touch control device of claim 5, wherein an adjacent display electrode is provided on an inner side of the first and second ESD protection electrodes, a sensing capacitance exists between the adjacent display electrode and the first or second ESD protection electrode, a touch capacitance is formed between a user's finger and the first or second ESD protection electrode, and the touch capacitance and the sensing capacitance are linked in parallel to form an output capacitance that is greater than the sensing capacitance.

* * * * *